(12) United States Patent
Evans et al.

(10) Patent No.: US 11,790,917 B2
(45) Date of Patent: Oct. 17, 2023

(54) PROCESSING SPEECH-TO-TEXT TRANSCRIPTIONS

(71) Applicant: ARTICULATE.XYZ LIMITED, Hemel Hempstead (GB)

(72) Inventors: Paul Anthony Evans, Hemel Hempstead (GB); Colin Murgatroyd, Berkhamsted (GB)

(73) Assignee: ARTICULATE.XYZ LTD, Hertfordshire (GB)

( * ) Notice: Subject to any disclaimer, the term of this patent is extended or adjusted under 35 U.S.C. 154(b) by 658 days.

(21) Appl. No.: 17/040,449

(22) PCT Filed: Mar. 14, 2019

(86) PCT No.: PCT/EP2019/056515
§ 371 (c)(1),
(2) Date: Sep. 22, 2020

(87) PCT Pub. No.: WO2019/179884
PCT Pub. Date: Sep. 26, 2019

(65) Prior Publication Data
US 2021/0027786 A1    Jan. 28, 2021

(30) Foreign Application Priority Data
Mar. 23, 2018   (EP) ..................... 18163773

(51) Int. Cl.
*G10L 15/00* (2013.01)
*G10L 15/26* (2006.01)
*G09B 19/04* (2006.01)

(52) U.S. Cl.
CPC .............. *G10L 15/26* (2013.01); *G09B 19/04* (2013.01)

(58) Field of Classification Search
None
See application file for complete search history.

(56) References Cited

U.S. PATENT DOCUMENTS

| | | | | |
|---|---|---|---|---|
| 7,433,819 | B2 * | 10/2008 | Adams | G10L 15/26 |
| | | | | 434/362 |
| 8,109,765 | B2 * | 2/2012 | Beattie | G09B 5/04 |
| | | | | 434/179 |
| 9,520,068 | B2 * | 12/2016 | Beattie | G10L 15/26 |

(Continued)

FOREIGN PATENT DOCUMENTS

| | | | | |
|---|---|---|---|---|
| GB | 2544070 A | * | 5/2017 | ............ G09B 19/06 |
| GB | 2544070 A |   | 5/2017 | |

(Continued)

OTHER PUBLICATIONS

European Search Report for EP Application 18163773 dated Sep. 24, 2018.

(Continued)

*Primary Examiner* — Satwant K Singh
(74) *Attorney, Agent, or Firm* — Patrick Lavender

(57) ABSTRACT

Speech analysis is performed by receiving estimated glyphs corresponding to an estimate made by speech-to-text software of what has been spoken out loud by a user; comparing the estimated glyphs with reference glyphs representing a text from which the user has attempted to read; and providing feedback relating to the user's speech based on the comparison of the estimated glyphs with the reference glyphs.

12 Claims, 7 Drawing Sheets

| Alternative Words |
|---|
| come, came, Kim, cam |
| along, long, alone, on |
| but, putt, pad, pod, Budd, part, Pat, pride, pet |
| petty, Patty, party, paddy, patty, country, cuddy, ... |
| cut, kind, god, had, code, CAD, Cudd, I'd, tad, tied, and |
| Paddington |
| will, we'll, with |
| take |
| you, your |
| home, heard, harm, hard, higher, ... |
| take, thank, took |
| your, you |
| home, i, time, hi, high |
| and, when, mean, in |
| you |
| can, could |
| have |
| a, on, in, an |
| list, voice, lowest, west, Louis, Lewis, Lois, ... |
| hot, hope, hop, hawks, hotdogs, ..., hardball's, Hotmail |

(56) References Cited

U.S. PATENT DOCUMENTS

| | | | | |
|---|---|---|---|---|
| 11,682,318 | B2* | 6/2023 | Jochim | G09B 19/06 |
| | | | | 434/157 |
| 11,721,325 | B1* | 8/2023 | Park | G10L 15/063 |
| | | | | 704/200 |
| 2006/0069562 | A1* | 3/2006 | Adams | G09B 5/00 |
| | | | | 704/E15.04 |
| 2009/0150154 | A1* | 6/2009 | Jang | G10L 15/22 |
| | | | | 704/E15.005 |

FOREIGN PATENT DOCUMENTS

| | | | | |
|---|---|---|---|---|
| WO | 2006031536 A3 | 3/2006 | | |
| WO | WO-2006031536 A2 * | 3/2006 | | G09B 17/006 |

OTHER PUBLICATIONS

International Search Report for PCT/EP2019/056515 dated Jun. 4, 2019.

Written Opinion for PCT/EP2019/056515 dated Jun. 4, 2019.

* cited by examiner

| Alternative Words |
|---|
| come, came, Kim, cam |
| along, long, alone, on |
| but, putt, pad, pod, Budd, part, Pat, pride, pet |
| petty, Patty, party, paddy, patty, country, cuddy, ... |
| cut, kind, god, had, code, CAD, Cudd, I'd, tad, tied, and |
| Paddington |
| will, we'll, with |
| take |
| you, your |
| home, heard, harm, hard, higher, ... |
| take, thank, took |
| your, you |
| home, I, time, hi, high |
| and, when, mean, in |
| you |
| can, could |
| have |
| a, on, in, an |
| list, voice, lowest, west, Louis, Lewis, Lois, ... |
| hot, hope, hop, hawks, hotdogs, ..., hardball's, Hotmail |

Figure 1

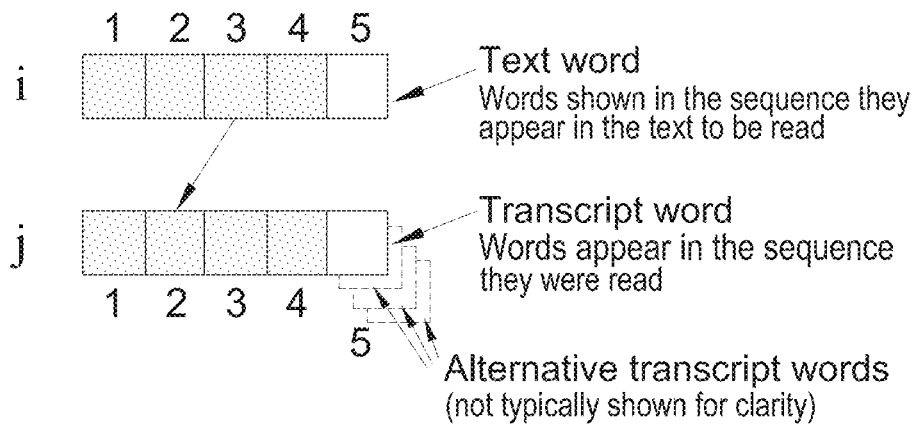

Figure 2

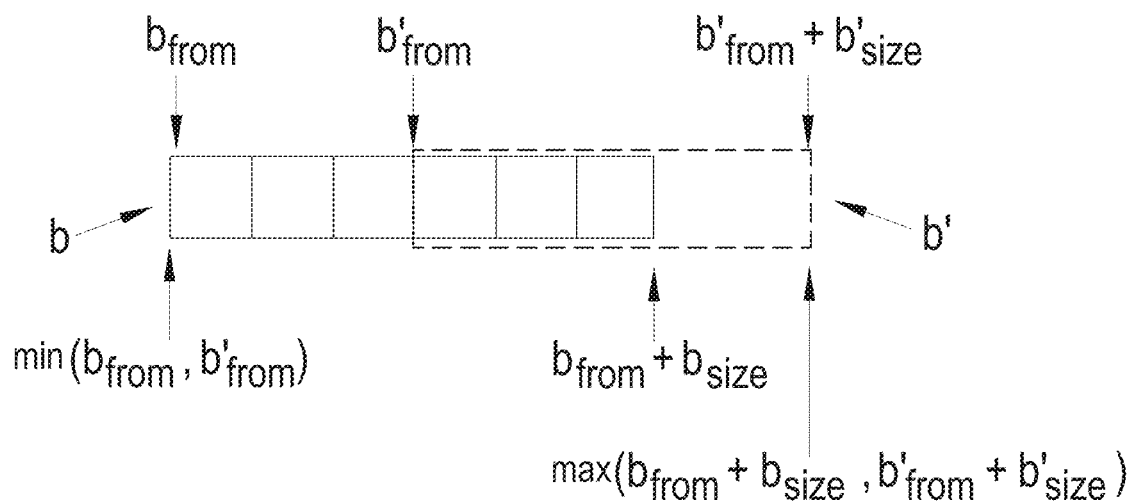
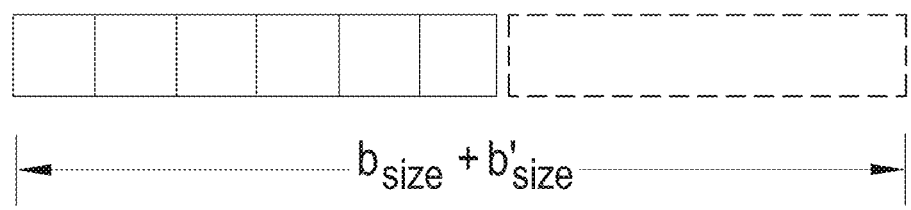
Figure 18

Figure 19

| Index | Text | Alternative words |
|---|---|---|
| 1 | come | come, came, Kim, cam |
| 2 | along | along, long, alone, on |
| 3 | | but, putt, pad, pod, Budd, part, Pat, pride, pet |
| 4 | | petty, Patty, party, paddy, patty, country, cuddy, ... |
| 5 | | cut, kind, god, had, code, CAD, Cudd, I'd, tad, tied, and |
| 6 | Paddington | Paddington |
| 7 | we'll | will, we'll, with |
| 8 | take | take |
| 9 | | you, your |
| 10 | | home, heard, harm, hard, higher, ... |
| 11 | | take, thank, took |
| 12 | you | your, you |
| 13 | home | home, I, time, hi, high |
| 14 | and | and, when, mean, in |
| 15 | you | you |
| 16 | can | can, could |
| 17 | have | have |
| 18 | a | a, on, in, an |
| 19 | nice | list, voice, lowest, west, Louis, Lewis, Lois, ... |
| 20 | hot | hot, hope, hop, hawks, hotdogs, ..., hardball's, Hotmail |
| 21 | bath | |

Figure 20

| Index | Text | Alternative words |
|---|---|---|
| 1 | come | come, came, Kim, cam |
| 2 | along | along, long, alone, on |
| 3 | | but, putt, pad, pod, Budd, part, Pat, pride, pet |
| 4 | | petty, Patty, party, paddy, patty, country, cuddy, ... |
| 5 | | cut, kind, god, had, code, CAD, Cudd, I'd, tad, tied, and |
| 6 | Paddington | Paddington |
| 7 | we'll | will, we'll, with |
| 8 | take | take |
| 9 | | you, your |
| 10 | | home, heard, harm, hard, higher, ... |
| 11 | | take, thank, took |
| 12 | you | your, you |
| 13 | home | home, I, time, hi, high |
| 14 | and | and, when, mean, in |
| 15 | you | you |
| 16 | can | can, could |
| 17 | have | have |
| 18 | a | a, on, in, an |
| 19 | nice | list, voice, lowest, west, Louis, Lewis, Lois, ... |
| 20 | hot | hot, hope, hop, hawks, hotdogs, ..., hardball's, Hotmail |
| 21 | bath | |

Figure 21

| Index | Text | Alternative words |
|---|---|---|
| 1 | come | come, came, Kim, cam |
| 2 | along | along, long, alone, on |
| 3 | | but, putt, pad, pod, Budd, part, Pat, pride, pet |
| 4 | | petty, Patty, party, paddy, patty, country, cuddy, ... |
| 5 | | cut, kind, god, had, code, CAD, Cudd, I'd, tad, tied, and |
| 6 | Paddington | Paddington |
| 7 | we'll | will, we'll, with |
| 8 | take | take |
| 9 | | you, your |
| 10 | | home, heard, harm, hard, higher, ... |
| 11 | | take, thank, took |
| 12 | you | your, you |
| 13 | home | home, I, time, hi, high |
| 14 | and | and, when, mean, in |
| 15 | you | you |
| 16 | can | can, could |
| 17 | have | have |
| 18 | a | a, on, in, an |
| 19 | nice | list, voice, lowest, west, Louis, Lewis, Lois, ... |
| 20 | hot | hot, hope, hop, hawks, hotdogs, ..., hardball's, Hotmail |
| 21 | bath | |

Figure 22

| Index | Text | Alternative words |
|---|---|---|
| 1 | come | come, came, Kim, cam |
| 2 | along | along, long, alone, on |
| 3 | | but, putt, pad, pod, Budd, part, Pat, pride, pet |
| 4 | | petty, Patty, party, paddy, patty, country, cuddy, ... |
| 5 | | cut, kind, god, had, code, CAD, Cudd, I'd, tad, tied, and |
| 6 | Paddington | Paddington |
| 7 | we'll | will, we'll, with |
| 8 | take | take |
| 9 | | you, your |
| 10 | | home, heard, harm, hard, higher, ... |
| 11 | | take, thank, took |
| 12 | you | your, you |
| 13 | home | home, I, time, hi, high |
| 14 | and | and, when, mean, in |
| 15 | you | you |
| 16 | can | can, could |
| 17 | have | have |
| 18 | a | a, on, in, an |
| 19 | nice | list, voice, lowest, west, Louis, Lewis, Lois, ... |
| 20 | hot | hot, hope, hop, hawks, hotdogs, ..., hardball's, Hotmail |
| 21 | bath | |

Figure 23

| Index | Text | Alternative words |
|---|---|---|
| 1 | come | come, came, Kim, cam |
| 2 | along | along, long, alone, on |
| 3 | | but, putt, pad, pod, Budd, part, Pat, pride, pet |
| 4 | | petty, Patty, party, paddy, patty, country, cuddy, ... |
| 5 | | cut, kind, god, had, code, CAD, Cudd, I'd, tad, tied, and |
| 6 | Paddington | Paddington |
| 7 | we'll | will, we'll, with |
| 8 | take | take |
| 9 | | you, your |
| 10 | | home, heard, harm, hard, higher, ... |
| 11 | | take, thank, took |
| 12 | you | your, you |
| 13 | home | home, I, time, hi, high |
| 14 | and | and, when, mean, in |
| 15 | you | you |
| 16 | can | can, could |
| 17 | have | have |
| 18 | a | a, on, in, an |
| 19 | nice | list, voice, lowest, west, Louis, Lewis, Lois, ... |
| 20 | hot | hot, hope, hop, hawks, hotdogs, ..., hardball's, Hotmail |
| 21 | bath | |

Figure 24

| Index | Text | Alternative words |
|---|---|---|
| 1 | come | come, came, Kim, cam |
| 2 | along | along, long, alone, on |
| 3 | | but, putt, pad, pod, Budd, part, Pat, pride, pet |
| 4 | | petty, Patty, party, paddy, patty, country, cuddy, ... |
| 5 | | cut, kind, god, had, code, CAD, Cudd, I'd, tad, tied, and |
| 6 | Paddington | Paddington |
| 7 | we'll | will, we'll, with |
| 8 | take | take |
| 9 | | you, your |
| 10 | | home, heard, harm, hard, higher, ... |
| 11 | | take, thank, took |
| 12 | you | your, you |
| 13 | home | home, I, time, hi, high |
| 14 | and | and, when, mean, in |
| 15 | you | you |
| 16 | can | can, could |
| 17 | have | have |
| 18 | a | a, on, in, an |
| 19 | nice | list, voice, lowest, west, Louis, Lewis, Lois, ... |
| 20 | hot | hot, hope, hop, hawks, hotdogs, ..., hardball's, Hotmail |
| 21 | bath | |

PROCESSING SPEECH-TO-TEXT TRANSCRIPTIONS

CROSS REFERENCE TO RELATED APPLICATIONS

This application is a National Phase Application under 35 U.S.C. § 371 of International Application No. PCT/EP2019/056515, filed Mar. 14, 2019, which claims priority to European Patent Application No. 18163773.7, filed Mar. 23, 2018, the disclosures of each of which are hereby incorporated by reference in their entireties for all intended purposes.

The invention relates to processing speech-to-text (StT) transcriptions. The invention includes methods, apparatus, computer programs and non-transitory computer-readable storage media which may provide improvements and/or advantages in relation to processing speech-to-text transcriptions.

StT transcription software produces a text transcript of what the software estimates a person has said out loud. The StT software can typically do this as the person speaks. In some circumstances, the transcript may for example be outputted to a word processor, so that the StT software provides a dictation-transcription service, allowing a user to compose letters or other documents by speaking out loud. In other circumstances, the text transcript may be parsed and interpreted as commands, e.g. to control a device such as a mobile phone, a light bulb or a climate control system.

The claimed invention aims to provide improved processing of speech-to-text transcriptions and additional functionality using speech-to-text transcriptions.

SUMMARY OF THE INVENTION

In one aspect, the present invention provides a method of analysing speech, comprising: receiving an estimate made by speech-to-text software of a reader's spoken reading of at least part of a reference text, the estimate comprising a plurality of estimated glyphs, each estimated glyph representing at least one grapheme; comparing the estimated glyphs with a plurality of reference glyphs representing at least part of the reference text, each reference glyph representing at least one grapheme; and providing feedback relating to the reader's speech based on the comparison of the estimated glyphs with the reference glyphs.

Embodiments of the invention provide an effective way of analysing a speech-to-text transcription of a reading from a reference text so that feedback on a reader's fluency can be provided. In particular, by comparing glyphs representing graphemes or combinations of graphemes, embodiments of the invention are language independent.

In one embodiment, each reference glyph represents at least one word in the reference text and each estimated glyph represents a set of one or more alternative words or phrases estimated by the speech-to-text software to be a word spoken by the reader/user. This embodiment improves the handling of homophones (e.g. "sail" and "sale"), near homophones ("are" and "our"), and errors or uncertainties in the transcript caused by stutters or a strong accent of the reader.

In one embodiment, comparing the estimated glyphs with the reference glyphs comprises: linking each estimated glyph to any matching reference glyphs to produce a plurality of links; identifying conflicts between the links; and pruning the links by removing some conflicting links to resolve all of the identified conflicts. Linking matching glyphs and pruning conflicting links enables the removal of disfluencies such as stutters, errors and repeated words in the transcript. Linking all matching glyphs ensures a maximal set of links for analysis. Removed disfluencies can still be analysed to provide feedback, either directly or indirectly by their absence—for example, there will be time gaps in the remaining transcript indicating where disfluencies occurred.

In one embodiment, identifying conflicts between the links comprises identifying links that violate at least one rule of a set of rules, the set of rules comprising: (1) one reference glyph may not be linked to more than one estimated glyph; no one reference glyph may have two links (2) one estimated glyph may not be linked to more than one reference glyph; and (3) no two links may cross over each other. Applying these three rules removes links that represent typical errors in a reading to obtain an accurate picture of how fluent the reader is.

In one embodiment, pruning the links comprises: selecting a first link and identifying a set of links that conflict with the first link; determining a cost of keeping each link in the identified set of conflicting links, the cost comprising the number of links conflicting with each link in the set; and removing the conflicting links except the one having the lowest cost. Iteratively selecting links, determining a cost associated with keeping that link or conflicting links, and keeping the link with the lowest cost helps ensure that the end result provides the best correlation between the transcript and the reference text.

In one embodiment, the method comprises producing a plurality of link bundles from the plurality of links, each link bundle comprising one or more links that form a contiguous sequence of estimated glyphs matching a contiguous sequence of reference glyphs; and wherein: identifying conflicts between links comprises identifying conflicts between link bundles; and pruning the links comprising removing some conflicting link bundles to resolve the identified conflicts. Creating link bundles creates sections of links that represent a fully fluent reading. This enables better and more consistent processing of transcripts containing reading errors or similar "noise". By defining a link bundle to include any single link or any group of contiguous links, a maximal set of link bundles is created to further improve the analysis.

In one embodiment, pruning links further comprises keeping larger link bundles in preference to smaller link bundles to resolve the identified conflicts. Large link bundles represent fluent readings, with little "noise", so keeping them in preference to individual links or smaller link bundles helps ensure that the best estimate of the reading is retained.

In another aspect, the invention provides a method of analysing a user's speech, comprising: receiving one or more estimated glyphs corresponding to an estimate made by speech-to-text software of what has been spoken out loud by a user; comparing the one or more estimated glyphs and one or more reference glyphs from which the user has attempted to read; and providing feedback relating to the user's speech based on the comparison of the one or more estimated glyphs and the one or more reference glyphs.

Optionally, providing feedback on the user's speech comprises: producing a plurality of links, each link connecting a glyph in the one or more estimated glyphs and a glyph in the one or more reference glyphs; and applying to the plurality of links a pruning process to identify conflicts between links and to resolve said conflicts.

Optionally, the pruning process comprises applying at least one rule to the plurality of links, the at least one rule specifying that: one glyph in the one or more reference glyphs may not be linked to more than one glyph in the one or more estimated glyphs; one glyph in the one or more estimated glyphs may not be linked to more than one glyph in the one or more reference glyphs; or the links linking glyphs in the one or more estimated glyphs and the one or more reference glyphs may not cross each other.

Optionally, the pruning process comprises removing one or more links which do not comply with the at least one rule.

Optionally, the pruning process comprises determining a cost of retaining a link and comparing the cost of retaining said link and a cost of retaining a different link to determine which of two links to remove.

Optionally, each link comprises a pair of indices identifying a corresponding glyph in each of the one or more estimated glyphs and the one or more reference glyphs.

Optionally, the method further comprises producing a plurality of link bundles, each link bundle including at least one link from the plurality of links.

Optionally, the one or more estimated glyphs corresponding to an estimate made by speech-to-text software of what has been spoken out loud by a user are produced based on an output signal provided by a microphone.

Optionally, the feedback comprises one or more of: at least one parameter indicative of the fluency of the user's speech; and at least one representation of the user's current reading position in the one or more reference glyphs.

Aspects of the invention may be embodied as, for example, an apparatus, a computer program, or a non-transitory computer-readable storage medium.

Specific embodiments of the invention will now be described by way of non-limiting examples, in which:

FIG. 1 illustrates an example output from StT transcription software;

FIG. 2 illustrates an approach for correlating words in a text to be read and words in a StT transcript;

Figure 3:
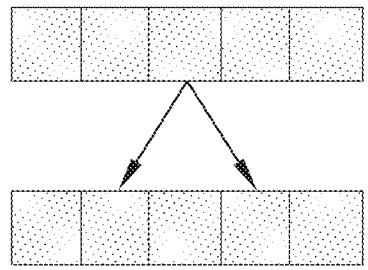
FIG. 3 illustrates an example of a first rule for pruning correlations between a text to be read and words in a StT transcript.

FIG. 18 schematically illustrates a method for determining whether a pair of link bundles overlap each other;

FIG. 19 illustrates the approach of FIG. 2 applied to the example output of FIG. 1;

FIG. 20 illustrates the example of FIG. 19 part way through a link pruning process;

FIG. 21 illustrates the example of FIG. 19 after a link pruning process has been completed; and FIGS. 22, 23 and 24 illustrate a link bundle approach applied to the output of FIG. 1;

The present embodiments represent the best ways currently known to the applicant of putting the invention into practice, but they are not the only ways in which this can be achieved. They are illustrated, and they will now be described, by way of example only.

In some circumstances it may be desirable to compare the text transcript outputted by StT transcription software and another text, such as a text from which a user is reading. This may for example make it possible to establish the current reading position of the user in the text. It may also make it possible to give an indication of the accuracy of the speech of the user who is reading the text. This may allow users who wish to improve their spoken English to read stories, newspapers and other text out loud and receive feedback on data points like reading accuracy, reading speed, fluency and pronunciation. The user may be provided with feedback on her or his articulation of the text that she or he has spoken out loud.

Establishing the current reading position of the reader may be achieved by comparing the StT transcript with the text being read. In ideal conditions, that might be straightforward—the StT transcript may match exactly the text being read, such that there is a one-to-one correspondence between the StT transcript and the text. In such circumstances, the current reading position can be identified using the most recently added word in the StT transcript. However, there are a number of factors that may make tracking the current reading position difficult in real circumstances. A reader, particularly one who is learning to read, will likely not read the text fluently. He or she might for example slow down or stop mid-way through an unfamiliar word in a sentence and then resume his or her previous reading pace. The reader might use filler words (such as "um", "so" or "like"). The reader might recognise that he or she has made a mistake and go back to the beginning of a word, line, sentence or paragraph to have another attempt at a fluent reading. The reader may miss a word; inadvertently skip a line of text; re-read a word, line or sentence; read a block of text out of order; or get lost in the text. Furthermore, the StT software may on occasion mis-transcribe what the reader has said, especially if, for example, the reader has an accent which the StT software cannot interpret correctly. Any of these points may lead to errors in transcription, which makes comparing the text from which the user is reading and the output of the StT software difficult and prone to errors.

FIG. 1 illustrates an example output from StT software when a user performs a disfluent reading. In the illustrated example, the user attempts to read out loud the text "Come along, Paddington. We'll take you home and you can have a nice hot bath" from Please Look After This Bear by Michael Bond. The StT software transcribes the user's attempt, and the various alternative words estimated by the StT software to have been said are shown in the table illustrated in FIG. 1, listed in rows of alternatives in decreasing order of confidence from left to right. For example, the user's attempt at the word "Come" at the beginning of the text extract has been interpreted by the StT software as (in order of decreasing confidence) "come", "came," "Kim" or "cam". Similarly, "along" has been interpreted by the StT software as "along", "long", "alone" or "on".

The user's reading starts off fluently with "come along", then falters with a few tries of "Paddington" before getting it right. "we'll take you home" comes next, although what the reader actually says is "we'll take your home" followed by a self-correction of "take you home". Finally, we get "and you can have a", followed by a mis-transcription of "nice", then "hot". "bath" appears to have been missed but, on further inspection of alternative words in the last row of the StT output, "hardball's" appears; with a bit of interpretation, that could be seen as "hot bath".

All of the above disfluencies may make it difficult to establish from the StT transcript the current position, at any given time, of the reader in the text being read. One therefore needs to try to identify and eliminate disfluencies in the StT transcript. In order to do that, one can first attempt to correlate words in the StT transcript and the text being read.

For words that do not appear often, correlation might be trivial. For instance, a word that appears once in the text being read and once in the transcript could be correlated with confidence. However, this is typically not the case. In the short example above, the word 'you' appears twice and, if the user had read on further in the book from which the extract was taken, other words would also have appeared multiple times, including not so common words like 'Paddington'.

One approach for correlating between the text being read and the StT transcript might be to look for hesitations. For instance, one could look at hesitation words or phrases in the transcript like 'erm', 'um', 'I mean', and so on, and remove these from consideration for correlation. However, this approach poses several problems. The list of hesitation words and phrases would likely continue to grow as new hesitation phrases are discovered. Different readers will quite likely use different 'pet' hesitation phrases, so while one reader might use "I mean", another might use "er, sorry", and when implemented as software this would result in frequent software updates, which could be difficult to maintain. Hesitation words might also legitimately appear in the text being read and so should not simply be removed.

Another approach might be to look for repetitions. As in the example of FIG. 1, a reader will sometimes falter and repeat a word or a phrase, or even start reading over at the start of the sentence or paragraph. One could look for repeated words or sequences of words, recognize them as repetitions, and exclude them from consideration for correlation. However, there are a number of problems with this approach too. Repeated words may legitimately appear in the text being read. For instance, the construct "had had" as in the sentence "I had had too many chocolates and so didn't feel very well." would be a legitimate use of a repeated word. One cannot predict how long a sequence of repeated words one should look for, since some readers will repeat only the word they got wrong, while others might repeat from the beginning of the line, the beginning of the sentence, or the beginning of the paragraph. In addition, repetitions are often mixed up with hesitation phrases and so are not necessarily straightforward to spot. For instance, it is difficult to codify how to discern the repetitions and the hesitation words from the words "Today is Wednes, er I mean, today is Wednesday".

FIG. 2 illustrates a general approach to correlating words in a text to be read and words in a StT transcription, in accordance with embodiments of the invention. The text words are shown in the order in which they are intended to be read along the top of the figure. Each word in the text to be read is given an index (shown in the illustrated example as "i", with i being a number between 1 and 5), and similarly each word or group of words estimated by the StT software to have been read is given an index (shown in the illustrated example as "j", with j being a number between 1 and 5).

Correlation is modelled with links, each link correlating a text word and a transcript word. In this context, a "transcript word" may in fact include a plurality of alternative transcript words provided by the StT software. This concept is illustrated for the transcript word with index j=5 in FIG. 2—the StT software has provided several options for what it estimates the final utterance in the illustrated transcript was, represented by the cascading squares at index j=5 in the row of transcript words in FIG. 2. If one of those alternative transcript words at index j=5 matches a text word, that text word and that collection of alternative transcript words will be correlated by a single link. For simplicity of representation, alternative transcript words are not generally illustrated in the figures, but any of the transcript words in FIG. 2 or the other figures may also have multiple alternative transcript words.

In the figures, correlation between text words and transcript words is represented pictographically as arrows connecting text words and transcript words. A link may sometimes be shown in bold for emphasis. Correlation may however be represented and/or stored in other ways. For example, a given link l may be represented as a pair of values (i, j) indicating the starting and ending points of the link, i.e. the word in the text to be read and the word or group of words in the StT transcription that are connected by the link. For instance, the link illustrated in FIG. 2 may be represented as (3, 2), because it connects the word at index i=3 in the text to be read and the word or group of words at index j=2 in the StT software's output.

Ultimately, a set of links between text words and transcript words should model as close to a fluent reading of the text as possible. A fluent reading can be categorized as a reading in which words are read in the correct order and in which a word in the text is correlated with at most one word in the transcript, and conversely a word in the transcript is correlated with at most one word in the text. These constraints can be captured by three rules which any links correlating text words to transcript words must satisfy if the set of links is to represent a fluent reading.

Rule 1: no two links can link the same text word to a transcript word. Since any word in the text should only be read once in a valid reading there should be at most one link between a text word and a transcript word. As a consequence of rule 1, the two links illustrated in FIG. 3 cannot both be part of a fluent reading, since the two links illustrated correlate one text word to two transcript words. It is possible that a text word cannot be linked to any transcript word—for instance if a word was skipped (i.e. not read) by the reader or if the word was mis-transcribed by the StT software.

Rule 2: no two links can link the same transcript word to a text word. A word in the transcript should correspond with at most one word in the text. In a perfect reading, each text word would link to a transcript word. As a consequence of rule 2, the links illustrated in FIG. 4 cannot both be part of a fluent reading, since the two links correlate two text words with one transcript word. A transcript word might not be linked to any text word for any one of a number of reasons.

A mis-transcribed word, one that was never said by the reader, may not be linked to the text; hesitation words will not be linked to a text word; and words that have been re-read may not be linked, for example.

Figure 5:
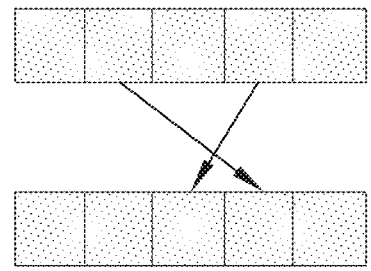
FIG. 5 illustrates an example of a third rule for pruning correlations between a text to be read and words in a StT transcript.

Rule 3: no two links can cross over. Links that cross over indicate words that have been read out of order. As a consequence of rule 3, the links illustrated in FIG. 5 cannot both be part of a fluent reading.

Links that violate rule 1, rule 2 or rule 3 are said to conflict. Methods for resolving such conflicts are set out in the following paragraphs.

To try to arrive at a set of links representing a fluent reading, one must first create a maximal set of links between the text words and the transcript words. The maximal set of links will include a link wherever a text word matches a transcript word (a transcript word potentially including, as discussed above, several alternative transcript words put forward by the StT software for a single utterance). The maximal set of links is therefore unlikely to model a fluent reading.

Steps for creating a maximal set of links is discussed in more detail in the following paragraphs, in which each text word te in the text has an index in the text Te, as illustrated in FIG. 2 with the letter i. The text can therefore be thought of as an array of text words. Similarly, each transcript word tr in the transcript Tr has an index, as illustrated in FIG. 2 with the letter j. The steps can be represented as follows.

1. Set L={ }

This will be the set of candidate links. Initially L is empty, but it gets filled as candidate links are identified.

2. Set i=1
3. Set $te_i$ to be the text word at index i in Te.
4. Set $Tr_i$=match($te_i$, Tr)

$Tr_i$ is a set of transcript words that match $te_i$. match(te, Tr) searches each transcript word tr in Tr, returning tr if te matches any of the alternative words in the transcript word.

5. For each tr in $Tr_i$
5.1. Set L=L∪{Link(i, j)}—where j is the index of the transcript word tr.

Link creates a link between the text word te at index i and the transcript word tr at index j. Note that this records the indices only—not the words.

6. Set i=i+1
7. If i>$te_{last}$—where $te_{last}$ is the index of the last word in Te.

HALT
else
Go to step 4.

As discussed above, this creates a maximal set of links correlating as many text words and as many transcript words as possible. The maximal set of links is unlikely to represent a fluent reading of the text, since in most cases words will feature more than once in the text and therefore, assuming such words are correctly transcribed at least once, rule 2 will be broken. The other rules may also be broken.

Once the maximal set of links has been established, a pruning process or method ("prune") can be applied to the maximal set of links to identify links which break one or more of rules 1, 2 and 3 and remove links until the rules are all complied with. The pruning process should maximise the number of remaining links, since this will result in the best correlation of text and transcript words.

The preferred pruning process removes links by evaluating the cost of keeping conflicting links. The cost of keeping a link is the number of conflicting links that would need to be removed in order to satisfy the three rules. Given a set of links, the pruning process considers each link in turn, together with its conflicting links, and keeps the link that has the lowest cost, since this is the link that results in the fewest conflicting links being removed.

The steps of the preferred pruning process for links can be represented as follows.

1. Set $L_{remaining}$={ }, $L_{removed}$={ }.

These are sets that keep track of links that are pruned (removed) and links that remain.

Initially they are empty but get filled as the pruning process proceeds.

2. Set $L_{unprocessed}$=L-{$L_{remaining}$∪$L_{removed}$}
3. If $L_{unprocessed}$={ }
HALT
4. Pick a link I in $L_{unprocessed}$
5. Set $L_{conflicting}$=conflicts(I, $L_{unprocessed}$)

conflicts (I, L) returns a subset of L containing links that conflict with I, that is break at least one of the rules R1, R2 or R3.

6. Set $c_I$=|$L_{conflicting}$|

This is the size of the set $L_{conflicting}$, that is the number of links that conflict with I.

7. Set $c_{min}$=min({$c_{I'}$: $c_{I'}$=|conflicts (I', $L_{unprocessed}$)|, I' ∈$L_{conflicting}$})

In words, find the cost, $c_{I'}$, to keep each link I' in $L_{unprocessed}$. Find the link with the minimum cost and save it in $c_{min}$.

8. If $c_I$<=$c_{min}$
  8.1. $L_{removed}$=$L_{removed}$∪$L_{conflicting}$
  8.2. $L_{remaining}$=$L_{remaining}$∪{I}
else
  8.3. $L_{removed}$=$L_{removed}$∪{I}

Decision time. If $c_I$<=$c_{min}$ then we keep link I. So we add I to $L_{remaining}$ and add all the conflicting links to $L_{removed}$.

If $c_I$>$c_{min}$ then we remove I, so add I to $L_{removed}$.

9. Go to step 2

Note that in step 8 a link is added from L to either $L_{remaining}$ or $L_{removed}$. Eventually, therefore, $L_{remaining}$∪$L_{removed}$=L and $L_{unprocessed}$ will be { }, so this pruning process eventually terminates in step 3. When it terminates, all links in $L_{remaining}$ will satisfy rules R1, R2 and R3. The pruning process works with links which, as noted previously, may be represented as pairs of indices. While the indices refer to words in the text and transcript, the pruning process does not make use of words at all. Nor does the pruning process assume any order (for instance left to right, or right to left) for links to be considered for pruning. Therefore, while the described and illustrated examples use English words for the purposes of illustration, the pruning process is language agnostic and should work equally well with other languages. As well as being applicable to words, the pruning process can be applied to any graphemes or combinations of graphemes, such as alphabetical letters, numerical digits, punctuation, syllables, logograms, pictograms, ideograms, shorthand notation or other representations of spoken language or utterances. In this document, the word "glyph" is intended to include any such representation of spoken language or utterances. In this document, one or more glyphs may constitute a "text" (such as the "reference text" referred to in the described and illustrated embodiments).

Figure 6:
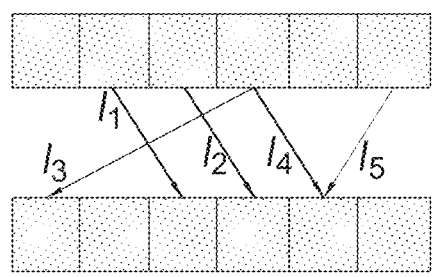
FIG. 6 illustrates an example maximal set of links correlating words in a text to be read and words in a StT transcript.

An example set of links to be pruned is illustrated in FIG. 6. Suppose the pruning process considers link $I_4$ first. $I_4$ conflicts with links $I_3$ (because $I_3$ and $I_4$ correlate the same text word with two transcript words, in contravention of rule 1) and $I_5$ (because $I_4$ and $I_5$ correlate two text words with the same transcript word, in contravention of rule 2). The rows of the table below give the costs of keeping $I_4$ and its conflicting links, the links conflicting with the respective links, along with the rules that are broken by the respective conflicts.

| Link | Cost | Conflicting links |
|---|---|---|
| $I_3$ | 3 | $I_1$ (R3), $I_2$ (R3), $I_4$ (R1) |
| $I_4$ | 2 | $I_3$ (R1), $I_5$ (R2) |
| $I_5$ | 1 | $I_4$ (R2) |

In this example, $I_5$ has the lowest cost to keep ($c_{min}=c_5=1$ vs $c_4=2$) and we would remove $I_4$. Suppose the pruning process considers link $I_1$ next. Only $I_3$ conflicts with $I_1$. The cost of keeping $I_1$ is $c_1=1$, while the cost of keeping $I_3$ is $c_3=2$, since $I_3$ conflicts with $I_1$ and $I_2$ (both by virtue of rule 3) after $I_4$ has been removed. $I_3$ is therefore removed, and the remaining links ($I_1$, $I_2$ and $I_5$) do not conflict with one another, so the pruning process finishes.

As previously noted, the pruning process assumes no order for links to be considered for pruning. In practice, in a few readings order does matter. Correlating links in the same transcript in a different order can result in subtly different correlations, some of which have more links than others—and the aim of the pruning process is to maximize the number of correlated words in a transcript. This variation in the number of correlated links tends to occur in readings with many disfluencies and in particular where a piece of text contains the same sequence of words. That said, even a disfluent reading will typically have patches of fluent reading. These patches can be identified as a sequence of links from contiguous text words to contiguous transcript words such as those illustrated in FIG. 7. The fluent reading is indicated by the bold arrows and white boxes.

Figure 7:
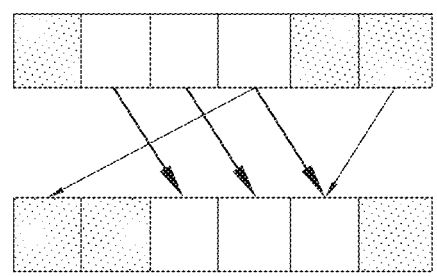
FIG. 7 illustrates the example of FIG. 6 with a sequence of links from contiguous text words to contiguous transcript words indicated by bold arrows and white boxes.

The order in which links are considered for pruning in the example of FIG. 7 affects which links survive pruning, as will now be described with reference to FIGS. 8, 9, 10 and 11. In each example the links have been numbered in the order in which they are considered for pruning (i.e. link $I_1$ will be considered first, then link $I_2$, and so on).

Figure 8:
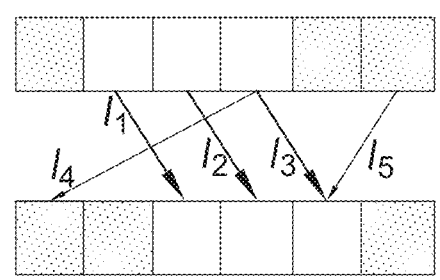
FIG. 8 illustrates a variation of the example maximal set of links of FIG. 6.

In the example of FIG. 8, the pruning process considers link $I_1$ first. The cost of keeping $I_1$ is 1 ($I_4$ needs to be removed in order to keep $I_1$). $I_4$ is the only link conflicting with $I_1$. The cost of keeping $I_4$ is 3 ($I_1$, $I_2$ and $I_3$ would need to be removed), so $I_4$ is removed. There are no links conflicting with $I_2$. There is one link, $I_5$, conflicting with $I_3$. The cost of keeping $I_3$ is 1 ($I_4$ has already been removed, so the only other conflicting link is $I_5$). The cost of keeping $I_5$ is also 1 (its only conflicting link is $I_3$). At this point, the pruning process makes an arbitrary decision to keep $I_3$ and to remove $I_5$. The link being considered is retained in favour of conflicting links when the cost of keeping each link is the same. The pruning process could make use of the weight of the link (that is, how far down the list of alternative words one has to search before finding a match) to differentiate between conflicting links in this case, but even this could result in a 'tie' so that an arbitrary decision on which link should be kept and which should be removed is still required.

Figure 9:
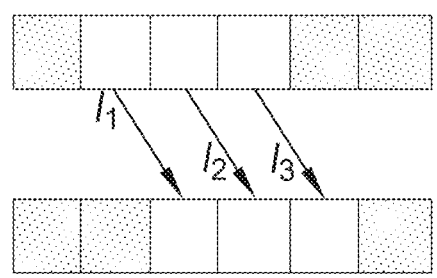
FIG. 9 illustrates the set of links of FIG. 8 after the first, second and third rules for pruning of FIGS. 3 to 5 have been applied.

The above pruning process results in links $I_1$, $I_2$ and $I_3$ remaining, as indicated in FIG. 9. This is a good outcome, in the sense that those links represent the "fluent" reading indicated by the white boxes and bold arrows in FIG. 7.

Figure 10:
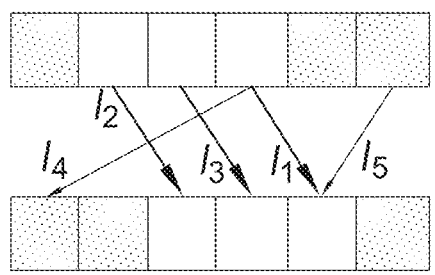
FIG. 10 illustrates a variation of the example maximal set of links of FIG. 6.
Figure 11:
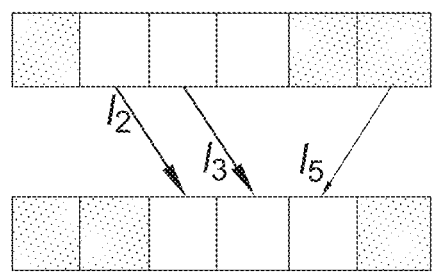
FIG. 11 illustrates the set of links of FIG. 10 after the first, second and third rules for pruning of FIGS. 3 to 5 have been applied.

FIG. 10 illustrates the same example but with the links considered in a different order. In the context of FIG. 10, the cost of keeping $I_1$ is 2 ($I_1$'s conflicting links are $I_4$ and $I_5$). The cost of keeping $I_4$ is 3 ($I_4$ conflicts with $I_1$, $I_2$ and $I_3$). The cost of keeping $I_5$ is 1 ($I_5$ conflicts with $I_1$), so $I_1$ is removed! The cost of keeping $I_2$ is 1 ($I_2$'s conflicting link is $I_4$). The cost of keeping $I_4$ is 2 ($I_4$'s conflicting links are $I_2$ and $I_3$) so $I_4$ is removed. There are no links conflicting with $I_3$ and $I_5$.

This pruning process results in links I2, I3 and I5 remaining, which is sub-optimal—$I_1$, part of a fluent reading within the overall set of words, has been removed.

Thus there can be circumstances in which the order of considering links results in different overall outcomes, especially where the maximal set of links is particularly "noisy", i.e. contains a large number of erroneous links. It would therefore be desirable to reduce the likelihood that noisy links remain after pruning at the expense of the removal of 'good' links. Even a disfluent reading will typically have patches of fluent reading which can be recognised as a sequence of links correlating contiguous text words with contiguous transcript words. One approach to reduce the likelihood of noisy links remaining at the expense of good links is to group these good sequences of links together into link bundles, with the aim to run the pruning process described above on the link bundles. In order to do this, one must redefine slightly rules 1, 2 and 3 to take into account the behaviour of link bundles rather than individual links, as will be discussed in the following paragraphs.

The original definition of rule 1 requires that no two links can share the same text word. In the context of link bundles, this means that no link in one link bundle can share the same text word as a link in another text bundle. As a consequence, the link bundles $b_1$ and $b_2$ illustrated in FIG. 12 break rule 1. In particular, the conflicting links shown bold break rule 1. If the prune process is applied to bundles $b_1$ and $b_2$ then one entire bundle of links will be removed, so that a non-bold link will be removed (as well as the conflicting links in the bundle that is removed). If bundle $b_1$ were considered first, the pruning process would decide to remove bundle $b_2$. In fact, a preferable outcome would be that the two bold links from $b_2$ are removed, and the surviving link forms a new bundle, indicated as $b_n$ in FIG. 13. In more general terms, it would be preferable for a bundle $b_n$ to remain containing all of the links from $b_2$ which did not break rule 1.

Bundles that break rule 1 can be identified as follows. If b is a link bundle, $b_{from}$ an integer indicating the index of the first word in the text included in link bundle b, $b_{to}$ an integer indicating the index of the matching word in the transcript, and $b_{size}$ indicating the number of links in the bundle then link bundles b and b' break R1 if:

$$\max(b_{from}+b_{size},b'_{from}+b'_{size})-\min(b_{from},b'_{from}) < b_{size}+b'_{size}$$

FIG. 18 schematically illustrates why this expression identifies link bundles breaking rule 1. The left-hand side of the above expression is illustrated in the upper half of FIG. 18. The first link bundle b is illustrated as a rectangle comprising a series of squares, each square representing a link in the link bundle b (or, viewed another way, each square representing a word in the text from which a link in link bundle b extends). The link bundle b begins on the left-hand side of the figure (representing the index $b_{from}$) and extends rightwards a distance (number of squares) representing the number of links in the link bundle b ($b_{size}$) (i.e. representing the number of contiguous words in the text linked by the links in bundle b). The link bundle b therefore ends at $b_{from}+b_{size}$. A second link bundle b', also illustrated as a rectangle, begins at $b'_{from}$ and extends rightwards a distance representing the number of links in the link bundle b' ($b'_{size}$). The link bundle b' therefore ends at $b'_{from}+b'_{size}$.

Thus the greatest span of the text achieved by the two link bundles is from the minimum (left-most in FIG. 18) of $b_{from}$ and $b'_{from}$ to the maximum (right-most in FIG. 18) of $b_{from}+b_{size}$ and $b'_{from}+b'_{size}$.

The right-hand side of the expression is illustrated in the lower half of FIG. 18. The smallest span of the text achieved by the two link bundles b and b' if they were not overlapping (i.e. if there were no text word linked by a link in link bundle b and a link in link bundle b') would be $b_{size}+b'_{size}$ (illustrated by the two rectangles representing the two link bundles lying end to end). Therefore, if there is overlap between the two link bundles (i.e. rule 1 is broken by the two link bundles), the left-hand side of the expression (represented by the upper half of FIG. 18) will be smaller than the right-hand side of the expression (represented by the lower half of FIG. 18). If there is no overlap between the two link bundles (i.e. rule 1 is not broken by the two link bundles), the left-hand side of the expression will be at least as big as the right-hand side of the expression.

Rule 2 can be amended in a similar way to identify bundles which break rule 2. Link bundles b and b' break rule 2 if:

$$\max(b_{to}+b_{size}, b'_{to}+b_{size})-\min(b_{to}, b'_{to}) < b_{size}+b'_{size}$$

Rule 3 can also be extended to the context of link bundles. Link bundles b and b' break rule 3 if:

$$\text{sgn}(b_{from}-b'_{from})+\text{sgn}(b_{to}+b_{size}-(b'_{to}+b'_{size}))=0$$

where sgn is the sign or signum function, defined as sgn(i)=+1 for i>0, 0 for i=0, and −1 for i<0.

The above condition detects link bundles that break rule 3 and some cases where link bundles break rules 1 or 2. Because the pruning process works with sets of links, this has no impact on the working of the pruning process, since adding a link to a set more than once, e.g. if a link was detected as breaking rule 3 and rule 1, does not result in multiple instances of the same link arising in the set.

Figure 14:
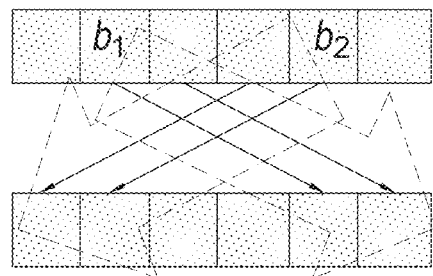
FIG. 14 illustrates a set of links gathered into link bundles $b_1$ and $b_2$.

An example of link bundles that cross over is illustrated in FIG. 14. In that example, the bundles simply cross over and one of $b_1$ or $b_2$ will be removed by the prune process.

Figure 12:
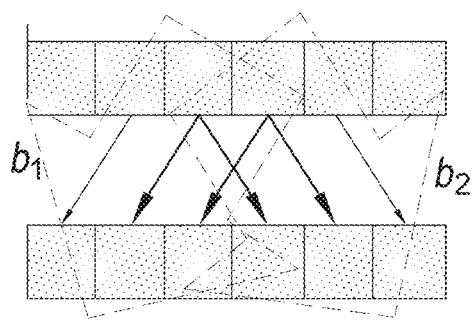
FIG. 12 illustrates a set of links gathered into link bundles $b_1$ and $b_2$.
Figure 13:
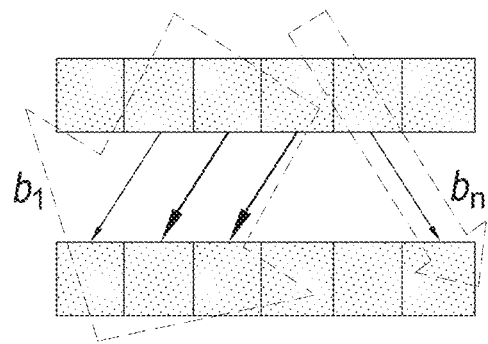
FIG. 13 illustrates the set of links of FIG. 12 after the rule for pruning of FIG. 3 has been applied to the link bundles.
Figure 15:
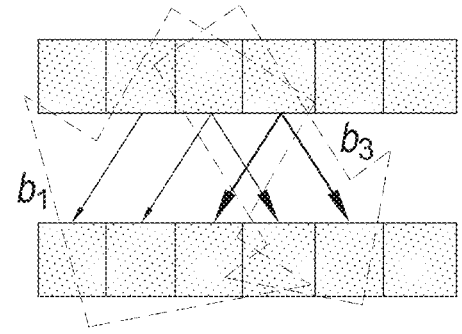
FIG. 15 illustrates a set of links gathered into link bundles $b_1$ and $b_3$.
Figure 16:
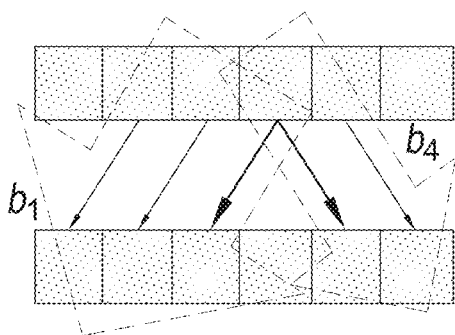
FIG. 16 illustrates a set of links gathered into link bundles $b_1$ and $b_4$.
Figure 17:
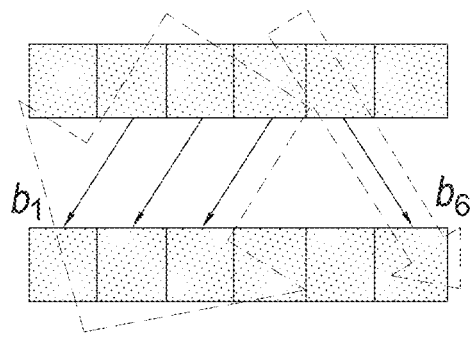
FIG. 17 illustrates a set of links gathered into link bundles $b_1$ and $b_6$.

Like with links, it is advantageous to create a maximal set of candidate link bundles. On the face of it, this may seem straightforward: simply collect links in L, the maximal set of candidate links, correlating contiguous text words with contiguous transcript words into a link bundle. However, this does not give a maximal set of link bundles. Given a link bundle b which contains, say, 3 contiguous links $I_1$, $I_2$ and $I_3$, also create link bundles containing $I_1$ and $I_2$, $I_2$ and $I_3$, $I_1$, $I_2$, and $I_3$. This gives a maximal set of candidate link bundles, each bundle comprising only contiguous links, and addresses an issue highlighted when discussing rule 1 in the context of link bundles above. The example provided in FIG. 12 shows two bundles $b_1$ and $b_2$ which break rule 1. The pruning process removes $b_2$ as a result, so that rule 1 is no longer broken. What the example in FIG. 12 didn't show (for clarity) is that there are other candidate link bundles to be considered, such as the link bundles illustrated in FIG. 15 and FIG. 16. The maximal set of link bundles created will include bundles $b_3$ and $b_4$. These also conflict with $b_1$ (by rule 1) and so will be removed by the pruning process. However, because a maximal set of candidate link bundles was created, there will also be another candidate link bundle, $b_6$ (illustrated in FIG. 17 and corresponding to bundle $b_n$ of FIG. 13), that does not conflict with $b_1$. So, the issue highlighted in R1 is managed without any special treatment.

The steps of the preferred pruning process for link bundles can be represented as follows.

Starting with a set of candidate links L, the pruning process steps are:

1. Set B=createLinkBundles(L)

createLinkBundles implements the steps outlined above for creating a maximal set of candidate link bundles 2. Set $B_{remaining}=\{\}$, $B_{removed}=\{\}$ These are sets that keep track of link bundles that are pruned (removed) and link bundles that remain. Initially they are empty, but they get filled as the pruning process proceeds.

3. Set $i=\max(\{b_{size}: b \in B-B_{removed}\})$

Find the size of the largest bundle, so that the original pruning process can be run starting with the largest bundles, then the next largest and so on.

4. Set $B_i=\{b: b_{size}==i, b\in\{B-B_{removed}\}\}$

5. Set $B_{remaining\_i}=\text{prune}(B_i)$

This is the original pruning process described above, adapted for link bundles using the rules 1, 2 and 3 extended as described above for link bundles.

6. Set $B_{remaining}=B_{remaining} \cup B_{remaining\_i}$ and $B_{removed}=B_{removed} \cup (B_i - B_{remaining\_i})$ $B_{remaining\_i}$ is the set of link bundles that survived pruning; those need to be added to $B_{remaining}$. $B_i - B_{remaining\_i}$ is the set of link bundles that got pruned; those need to be added to $B_{removed}$.

7. For each link bundle b in $B_{remaining}$ 7.1. Set $B_{conflicting}=\text{conflicts}(b, \{b': b' \in B \wedge b'_{size} < i\})$ conflicts (b, B) returns a subset of B containing link bundles that conflict with b—that is break at least one of the rules 1, 2 or 3, as amended for link bundles.

7.2. Set $B_{removed}=B_{removed} \cup B_{conflicting}$

Any bundles $b' \in B$ that conflict with b and have size<i should also be removed. The primary aim of link bundles is to get rid of noisy links, so larger link bundles are kept in preference to any smaller link bundles that conflict with them.

8. If i==0

HALT else

Go to step 3.

If i==0 then the pruning process finishes. There are no link bundles of size 0. Otherwise there may be link bundles that still haven't been considered for pruning.

FIG. 19 illustrates the approach of FIG. 2 applied to the disfluent reading example illustrated and described in the context of FIG. 1. The reader attempts to read out loud the text "Come along, Paddington. We'll take you home and you can have a nice hot bath" from Please Look After This Bear by Michael Bond. An index is provided in the left-hand column of the figure, the index being usable in conjunction with the text to be read (the words of which are in the middle column) and the output of the StT transcription software (the words of which, including the various alternative words suggested by the StT software for each utterance, are in the right-hand column of the figure).

An initial set of links connecting words in the text and words in the transcript has been created. Each link connects a word in the text with a word or group of alternative words in the transcript, illustrated using arrows in the figure. The set of links is a maximal set of links, in that a link has been created wherever a word in the text matches one of the alternative words in the StT software's output. For example, the word "Come" at index 1 in the text to be read is connected by a link to the group of words "'come', 'came', 'Kim' and 'cam'" at index 1 in the StT software's output and not to any other words or groups of words in the StT software's output, since the word "come" does not appear elsewhere in the StT software's output. However, the word "take" at index 8 in the text to be read is connected by links to the groups of words at index 8 and index 11 in the StT output, since the word "take" appears at both those positions in the StT software's output. Similarly, the word "you" at index 12 in the text to be read is connected by links to the groups of words at indexes 9, 12 and 15 in the StT output, since each of those groups of words includes the word "you".

As discussed above, although represented pictographically as arrows in the figures, links may in fact be represented and/or stored in other ways. For example, a given link/may be represented as a pair of values (i, j) indicating the starting and ending points of the link, i.e. the index of the word in the text to be read and the index of the word or group of words in the StT software output that are connected by the link. For instance, the link connecting the word "hot" in the text to be read and the group of words "hot", "hope", "hop", "hawks", "hotdogs", etc. may be represented as (20, 20), because it connects the word at index 20 in the text to be read and the group of words at index 20 in the StT software's output.

When the maximal set of links has been created, the pruning process is applied to the maximal set of links, to try to reduce the set of links to as close to a fluent reading of the text to be read as possible. The pruning process involves the application to the maximal set of links of rules 1 to 3 discussed above to try to identify and remove links which cause the read-through to be disfluent.

In the first instance, the sets $L_{remaining}$ and $L_{removed}$ are empty, and the set $L_{unprocessed}$ includes all 19 of the links illustrated in FIG. 19 (links (1,1), (2,2), (6,6), etc.). Since, $L_{unprocessed}$ is not empty, pick link (1,1) as a first link to test. There are no links conflicting with link (1,1), so set $L_{conflicting}=\{\ \}$ (i.e. the empty set). Therefore also set $c_f=0$, and $c_{min}=0$ (since there no conflicting links, the cost of keeping these links is taken to be 0). Because $c_f=c_{min}$, set $L_{removed}=\{\ \}$ and $L_{remaining}=L_{remaining}\cup\{(1,1)\}$. Then remove (1,1) from $L_{unprocessed}$, leaving the other 18 links still to be processed.

Thus after applying the pruning process to link (1,1), it is retained in $L_{remaining}$ and removed from $L_{unprocessed}$. The same applies to links (2,2), (6,6) and (7,7) when the pruning process is applied to them.

Next, pick link (8,8) (which is still in $L_{unprocessed}$). Set $L_{conflicting}=\{(8,11)\}$, since that link conflicts with link (8,8) by rule 1. Set $c_f=1$ and $c_{min}=4$ (since (8,11) conflicts with link (8,8) by rule 1 and links (12,9), (13,10) and (15,9) by rule 3—a total of four conflicts). In this case, $c_f<c_{min}$. Therefore set $L_{removed}=L_{removed}$ Å $\{(8,11)\}$ and $L_{remaining}=L_{remaining}\cup\{(8,8)\}=\{(1,1), (2,2), (6,6), (7,7), (8,8)\}$. Remove (8,8) from $L_{unprocessed}$.

Take (12,9) as the next element of $L_{unprocessed}$ to be considered. Set $L_{conflicting}=\{(12,12), (12,15)$ and $(15,9)\}$, since (12,9) conflicts with (12,12) and (12,15) by rule 1 and (15,9) by rule 2. Set $c_f=3$ (since (12,9) has a total of three conflicts) and $c_{min}=5$ (the cost of keeping link (12,12) is 5, since it conflicts with (12,9) and (12,15) by rule 1, with (15,12) by rule 2, and with (13,10) and (15,9) by rule 3; the cost of keeping (12,15) is 9, since it conflicts with (12,9) and (12,12) by R1, with (15,15) by R2, and with (13,10), (13,13), (14,14), (15,9) and (15,12) by R3; the cost of keeping (15,9) is 7, since it conflicts with (12,9) by R2, and with (13,10), (12,12), (13,13), (14,14), (15,12) and (15,15) by R3). In this case, $c_f<c_{min}$. Therefore set $L_{removed}=\{(8,11)\}\cup\{(12,12),$ (12,15), (15,9)\} and $L_{remaining}=\{(1,1), (2,2), (6,6), (7,7), (8,8)\}\cup\{(12,9)\}$. Remove (12,9) from $L_{unprocessed}$. $L_{unprocessed}$ still has elements in it.

FIG. 20 illustrates the links that remain in $L_{remaining}$ or $L_{unprocessed}$ at this point in the procedure.

Take (13,10) as the next element of $L_{unprocessed}$ to be considered. Set $L_{conflicting}=\{(13,13)\}$, since (13,10) conflicts with (13,13) by rule 1. Set $c_f=1$ (since (13,10) conflicts with (13,13) only) and $c_{min}=2$ (the cost of keeping (13,13) is 2, since it conflicts with (13,10) by rule 1 and with (15,12) by rule 3). In this case, $c_f<c_{min}$. Therefore set $L_{removed}=\{(8,11), (12,12), (12,15), (15,9)\}\cup\{(13,13)\}$ and $L_{remaining}=\{(1,1), (2,2), (6,6), (7,7), (8,8), (12,9)\}\cup\{(13,10)\}$. Remove (13,10) from $L_{unprocessed}$. $L_{unprocessed}$ still has elements in it.

Take (14,14) as the next element of $L_{unprocessed}$ to be considered. Set $L_{conflicting}=\{(15,12)\}$, since (14,14) conflicts with (15,12) by rule 3. Set $c_f=1$ (since (14,14) conflicts with (15,12) only) and $c_{min}=2$ (the cost of keeping (15,12) is 2, since it conflicts with (15,15) by rule 1 and with (14,14) by rule 3). In this case, $c_f<c_{min}$. Therefore set $L_{removed}=\{(8,11), (12,12), (12,15), (15,9), (13,13)\}\cup\{(15,12)\}$ and $L_{remaining}=\{(1,1), (2,2), (6,6), (7,7), (8,8), (12,9), (13,10)\}\cup\{(14,14)\}$. Remove (14,14) from $L_{unprocessed}$. $L_{unprocessed}$ still has elements in it.

The remaining unprocessed links have no conflicting links, so no further links are removed when the elements remaining in $L_{unprocessed}$ are processed. After the final iteration of the pruning process with link (20,20), $L_{removed}=\{(8,11), (12,12), (12,15), (15,9), (13,13), (15,12)\}$ and $L_{remaining}=\{(1,1), (2,2), (6,6), (7,7), (8,8), (12,9), (13,10), (14,14), (15,15), (16,16), (17,17), (18,18), (20,20)\}$. The pruning process terminates when $L_{unprocessed}=L-\{L_{remaining}\cup L_{removed}\}=\{\ \}$. FIG. 21 illustrates the links in $L_{remaining}$ at that point, i.e. when the pruning process has been completed.

Figure 4:
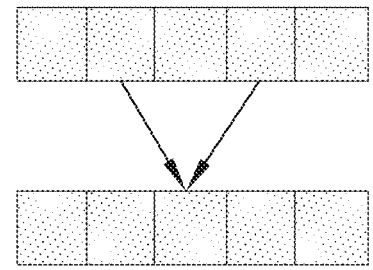
FIG. 4 illustrates an example of a second rule for pruning correlations between a text to be read and words in a StT transcript.

FIG. 22 illustrates the same example of text and StT transcript output, using link bundles. FIG. 22 illustrates a maximal set of link bundles. The link bundles containing more than one link are illustrated as large dashed arrows. Links contained in link bundles are shown as open, unfilled arrows. Link bundles containing only one link are shown as simple, black line arrows. In total there are 9 link bundles in FIG. 22—4 shown as large arrows and 5 as black line arrows. Link bundles are not explicitly labelled in the diagram, for clarity. Link bundles will be identified using the notation (j,k,m), indicating a link bundle containing m links with the first contained link from text word j to transcript (StT output) word k. Thus the link bundle at the top of FIG. 22 (the link bundle containing links (1,1) and (2,2)) is identified as (1,1,2), since the first link in the link bundle links the text word at index 1 ("come") and the transcript words at index 1 ("come", "came", "Kim", "cam"), and the link bundle contains a total of 2 links.

Applying the link bundle pruning process described above to the example illustrated in FIG. 22 proceeds as follows.

Set $B=\{b_{1,1,2}, b_{6,6,3}, b_{8,11,1}, b_{12,9,2}, b_{12,15,1}, b_{12,12,7}, b_{15,9,1}, b_{15,12,1}, b_{20,20,1}, \ldots\ \}$. B will include further link bundles which form sub-bundles of those listed here. For example, in addition to $b_{1,1,2}$, there will be $b_{1,1,1}$ and $b_{2,2,1}$. However, those sub-bundles are not listed above or in the following steps, for simplicity.

In the first instance, the sets $B_{remaining}$ and $B_{removed}$ are empty. Set i=7 (the size of the largest bundle, which in this example is $b_{12,12,7}$). $B_i$ is the set of link bundles of size i. In the illustrated example, $b_{12,12,7}$ is the only example of a link bundle satisfying i=7. Therefore for i=7 set $B_i=\{b_{12,12,7}\}$. $B_{remaining\_i}$ is the result of running the link pruning process on $B_i$. Since $B_i$ only contains one bundle, nothing is pruned as a result of the link pruning process. Consequently, set $B_{remaining} = B_{remaining} \cup B_{remaining\_i} = \{b_{12,12,7}\}$ and $B_{removed} = \{\}$.

Next, for each b in $B_{remaining}$ (which, in this example, is only $b_{12,12,7}$), determine $B_{conflicting}$: $B_{conflicting} = \{b_{12,9,2}, b_{12,15,1}, b_{15,9,1}, b_{15,12,1}\}$ (since $b_{12,12,7}$ conflicts with $b_{12,9,2}$ and $b_{15,9,1}$ by rule 2 and with $b_{12,15,1}$ and $b_{15,12,1}$ by rule 1). Set $B_{removed} = B_{removed} \cup B_{conflicting} = \{b_{12,9,2}, b_{12,15,1}, b_{15,9,1}, b_{15,12,1}\}$. FIG. 23 illustrates the link bundles remaining at this point in the link bundle pruning process.

Next, set i=3 (the next-largest size of link bundle remaining in $B-B_{removed}$). Set $B_i = \{b_{6,6,3}\}$, since there is only one bundle of size 3 remaining. Set $B_{remaining\_i} = \{b_{6,6,3}\}$. $B_{conflicting}$ for $b_{6,6,3}$ is $\{b_{8,11,1}\}$ (since $b_{6,6,3}$ conflicts only with $b_{8,11,1}$, by rule 2). Set $B_{removed} = \{b_{12,9,2}, b_{12,15,1}, b_{15,9,1}, b_{15,12,1}\} \cup \{b_{8,11,1}\} = \{b_{8,11,1}, b_{12,9,2}, b_{12,15,1}, b_{15,9,1}, b_{15,12,1}\}$. FIG. 24 illustrates the link bundles remaining at this point.

As there are no remaining conflicting link bundles to be removed, further iterations of the link bundle pruning process lead to no further changes in the link bundles. Eventually, after testing the link bundles of size 2 and 1 for conflicts, i=0, at which point the link bundle pruning process halts.

In both the links case illustrated in FIG. 21 and the link bundles case illustrated in FIG. 24, the result is a set of correlations between words in a reference text (such as a text from which a user is reading) and words in a StT software transcription (e.g. the output of software which has interpreted input signals from a microphone or other device detecting the sounds produced by the reader).

The pruning processes and methods described above make it possible to provide various types of feedback about a user's speech. For example, the pruning processes and methods make it possible to keep track of a reader's current reading position, based on a StT transcription, in a way which is tolerant of significantly disfluent reading. This may enable functionality such as highlighting the reader's current position on a display. For example, if the user is reading from a text shown on a display (such as a computer screen, a mobile phone screen, a tablet screen or another display whose output can be controlled), the display may be able to highlight, underline or otherwise visually indicate the user's current position in the text, as the user reads. For instance, the display may be able to highlight the current word, line, sentence or paragraph, depending on user preference and the specific circumstances. This may help readers stay on course with their reading, helping them not to get lost in the text. It may also help to ensure that the speaker speaks all of the words accurately. For example, if it is determined by the StT software that the speaker has not said a specific word accurately (e.g. the speaker's pronunciation was incorrect or the user missed the word), the highlighting may not progress past that word until it has been determined that the user has said the word correctly. This may help to improve the speaker's ability to read confidently and precisely from a text.

The pruning processes and methods furthermore make it possible to track how many words were correctly read by a reader in a given reference text, and to identify words which were not correctly read. For example, it is possible, using the pruning processes and methods, to maintain an ordered list of words that have not been linked or are intermittently linked. The list may be ordered by the number of times the word hasn't been linked as a proportion of the number of times the word has been encountered in reading, therefore giving a kind of error rate (whether reader generated or software generated). In some embodiments, the list may contain only words with an error rate above a threshold value.

The pruning processes and methods may make it possible to distinguish reader errors from errors in the StT software in the above list. For instance, if a word appears in the list for the first time and it is known that the reader has read the word correctly many times previously (e.g. because the word has already appeared in texts the reader has read many times and been read without error) then this will likely be an error with the StT software. This is particularly true for common short words which do sometimes get missed by the StT software, such as 'the', 'and', and 'you'. A new word appearing in the list of unlinked words which hasn't been encountered by the reader before or an unlinked word that is already in the list may be a reading error which would be put into a 'practice' list for the reader. As a reader has practised a word in the list and pronounced it correctly the word will move down the list.

The pruning processes and methods may make it possible to produce metrics like 'words correct/words read' (where the number of words correct is based on the number of remaining links after pruning and/or the number of links pruned), and 'words read per minute', e.g. based on timing information in the transcript delivered by the StT software. Such timing information may be usable to spot silent hesitations, and/or to identify that punctuation is correctly interpreted by the reader—so that an appropriate pause is introduced into the speech on encountering things like ',', '.', ':', and so on.

The pruning processes and methods may be implemented in software which can be executed on a mobile phone, tablet, laptop, desktop, other personal computing device, or any apparatus which can receive a signal or data representative of sounds produced by a user and a processor which can process said signal or data. For example, the processor may receive data output by speech-to-text transcription software. Said data may have been produced by the processor itself, based on signals generated by a microphone or other speech input device. The apparatus preferably includes a display which a user can use to obtain substantially instantaneous feedback on his or her reading of a reference text.

The pruning processes and methods may alternatively or additionally produce metrics using information about how often words in the reference text linked to the first of the "alternative words" for a given utterance in the transcript. The pruning processes may make use of a weighting value, such as an index into the array of alternative words identifying where a particular match was found. In such cases, the weighting value may be arranged such that the smaller the weight, the more confident the StT software is of the match. A weight of 0 may for example indicate a reference word that is linked to the first of the alternative words. This could potentially give a speaker an indication of the accuracy of his or her pronunciation.

Embodiments of the invention may be performed by an apparatus including a processor and a memory. In this context, a processor may be any device or construct capable of carrying out instructions resulting in the performance of the processes and methods described above. The term "processor" is intended to include any suitable type of processor architecture. Similarly, in this context, a memory may be any device or construct capable of storing—whether temporarily or permanently—data to enable the processes and methods described above to be carried out. The term "memory" is intended to include any suitable type of storage, including volatile and non-volatile types of storage.

The invention claimed is:

1. An apparatus comprising a processor communicatively coupled to a memory, wherein the memory is configured for:
receiving an estimated transcription made by speech-to-text software of a plurality of words spoken by a reader reading from a reference text, the estimated transcription comprising a plurality of estimated glyphs, each estimated glyph representing at least one grapheme;
comparing the estimated glyphs with a plurality of reference glyphs representing the reference text, each reference glyph representing at least one grapheme, the comparison made by:
(a) linking each estimated glyph to any matching reference glyphs to produce a plurality of links;
(b) identifying conflicts between the links; and
(c) pruning the links by removing some conflicting links to resolve the identified conflicts; and
providing feedback relating to the reader's speech based on the comparison of the estimated glyphs with the reference glyphs.

2. The apparatus of claim 1 wherein each reference glyph represents at least one word in the reference text and each estimated glyph represents a set of one or more alternative words or phrases estimated by the speech-to-text software to be a word spoken by the reader.

3. The apparatus of claim 1, wherein identifying conflicts between the links comprises identifying links that violate at least one rule of a set of rules, the set of rules comprising:
(1) one reference glyph may not be linked to more than one estimated glyph; no one reference glyph may have two links
(2) one estimated glyph may not be linked to more than one reference glyph; and
(3) no two links may cross over each other.

4. The apparatus of claim 1, wherein pruning the links comprises:
selecting a first link and identifying a set of links that conflict with the first link;
determining a cost of keeping each link in the identified set of conflicting links, the cost comprising the number of links conflicting with each link in the set; and
removing the conflicting links except the one having the lowest cost.

5. The apparatus of claim 1, wherein the memory is further configured for producing a plurality of link bundles from the plurality of links, each link bundle comprising one or more links that form a contiguous sequence of estimated glyphs matching a contiguous sequence of reference glyphs; and wherein:
identifying conflicts between links comprises identifying conflicts between link bundles; and
pruning the links comprising removing some conflicting link bundles to resolve the identified conflicts.

6. The apparatus of claim 5 wherein pruning links further comprises keeping larger link bundles in preference to smaller link bundles to resolve the identified conflicts.

7. The apparatus of claim 1 wherein each link comprises a pair of indices identifying an estimated glyph and a matching reference glyph.

8. The apparatus of claim 1, wherein the feedback comprises
at least one parameter indicative of the fluency of the reader's speech.

9. The apparatus of claim 1, wherein the feedback comprises at least one representation of the reader's current reading position in the reference text.

10. An apparatus as claimed in claim 1, further comprising a microphone for detecting the sounds of the words spoken by the reader and for producing an output signal to the speech-to-text software.

11. A computer program comprising instructions which, when the program is executed by a processor, cause the processor to:
compare (i) a plurality of estimated glyphs corresponding to an estimated transcription made by speech-to-text software of a plurality of words spoken by a reader reading from a reference text with (ii) a plurality of reference glyphs representing the reference text, wherein each estimated glyph and each reference glyph represents at least one grapheme
wherein the comparison is made by:
(a) linking each estimated glyph to any matching reference glyphs to produce a plurality of links;
(b) identifying conflicts between the links; and
(c) pruning the links by removing some conflicting links to resolve the identified conflicts; and
provide feedback relating to the reader's speech based on the comparison of the estimated glyphs with the reference glyphs.

12. A non-transitory computer-readable storage medium encoded with instructions which, when performed by a processor, cause the processor to:
compare (i) a plurality of estimated glyphs corresponding to an estimated transcription made by speech-to-text software of a plurality of words spoken by a reader from a reference text with (ii) a plurality of reference glyphs representing the reference text, wherein each estimated glyph and each reference glyph represents at least one grapheme
wherein the comparison is made by:
(a) linking each estimated glyph to any matching reference glyphs to produce a plurality of links;
(b) identifying conflicts between the links; and
(c) pruning the links by removing some conflicting links to resolve the identified conflicts; and
provide feedback relating to the reader's speech based on the comparison of the estimated glyphs with the reference glyphs.

* * * * *